United States Patent [19]
Thompson et al.

[11] Patent Number: 5,944,082
[45] Date of Patent: *Aug. 31, 1999

[54] TIRE TREAD TO COMPENSATE RESIDUAL ALIGNING TORQUE

[75] Inventors: Ronald Hobart Thompson; Michel A. de Reynal, both of Greenville, S.C.

[73] Assignee: Michelin Recherche Technique S.A., Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/667,345

[22] Filed: Jun. 21, 1996

Related U.S. Application Data

[63] Continuation of application No. 07/998,326, Dec. 30, 1992, abandoned.

[51] Int. Cl.[6] .......................... B60C 11/13; B60C 103/00
[52] U.S. Cl. ................................ 152/209.8; 152/209.14; 152/209.23
[58] Field of Search ........................... 152/209 R, 209 A, 152/209 D, 209.8, 209.14, 209.23

[56] References Cited

U.S. PATENT DOCUMENTS

| | | | |
|---|---|---|---|
| 3,104,693 | 9/1963 | Bolenbach | 152/209 |
| 3,945,422 | 3/1976 | Pottinger | 152/361 DM |
| 4,284,115 | 8/1981 | Ohnishi | 152/209 R |
| 4,298,046 | 11/1981 | Herbelleau | 152/209 R |
| 4,305,445 | 12/1981 | Yoshioka | 152/209 R |

(List continued on next page.)

FOREIGN PATENT DOCUMENTS

| | | | |
|---|---|---|---|
| 296605 | 12/1988 | European Pat. Off. | 152/209 R |
| 384182 | 8/1990 | European Pat. Off. | 152/209 R |
| 3630590 | 3/1988 | Germany | 152/209 R |
| 41202 | 3/1982 | Japan | 152/209 D |
| 104404 | 6/1982 | Japan | 152/209 R |
| 147901 | 9/1982 | Japan | B60C 11/00 |
| 60307 | 3/1986 | Japan | 152/209 R |
| 97405 | 4/1988 | Japan | B60C 11/11 |
| 293205 | 4/1990 | Japan | B60C 11/11 |
| 293206 | 4/1990 | Japan | B60C 11/00 |
| 253409 | 11/1991 | Japan | 152/209 R |
| 100706 | 4/1992 | Japan | 152/209 R |

OTHER PUBLICATIONS translation of Japan 57–41202.
Abstract for Japan 4–100706.
SAE Paper No. 760731: Ply Steer In Radial Carcass Tires.
SAE Paper No. 870423: The Design and Belt angle Effect on Residual Aligning Torque.
SAE Paper No. 750406 Tire Induced Steering Pull.
SAE Paper No. 740074: Tire Conicity and Ply Steer Effects on Vehicle Performance.

*Primary Examiner*—Steven D. Maki
*Attorney, Agent, or Firm*—Alan A. Csontos; Robert R. Reed; Martin Farrell

[57] ABSTRACT

The tread of a rib type tire is modified to provide draft angles in lateral grooves of selected ribs to compensate the tire's residual aligning torque (RAT). This allows the vehicle to have straight ahead motion with no steering pull. The draft angles are achieved by inclining the radial centerline of the lateral grooves to be sloped forward on one side of the midcircumferential plane and sloped backward on the other side of the midcircumferential plane. The centerline draft angle results in tread blocks sloped forward and backward during forward motion of the vehicle. The sloping tread blocks produces an effective rolling radius change on selected ribs of the tread pattern. Effective rolling radius of selected ribs is a concept introduced to explain the physical relationships that exist in the contact patch of the tire with the ground surface. The resulting contact change introduces longitudinal tangential stress changes that induce a torque to compensate for the inherent residual aligning torque due to the unmodified tire's construction and tread pattern.

9 Claims, 8 Drawing Sheets

U.S. PATENT DOCUMENTS

| | | | |
|---|---|---|---|
| 4,819,704 | 4/1989 | Misawa | 152/209 R |
| 5,016,695 | 5/1991 | Kuze | 152/209 R |
| 5,044,414 | 9/1991 | Ushikubo | 152/209 R |
| 5,125,444 | 6/1992 | Yoshida | 152/209 R |
| 5,200,008 | 4/1993 | Enterline et al. | 152/209 R |
| 5,225,010 | 7/1993 | Shisheng | 152/209 R |
| 5,353,855 | 10/1994 | Kijiwara et al. | 152/209 R |

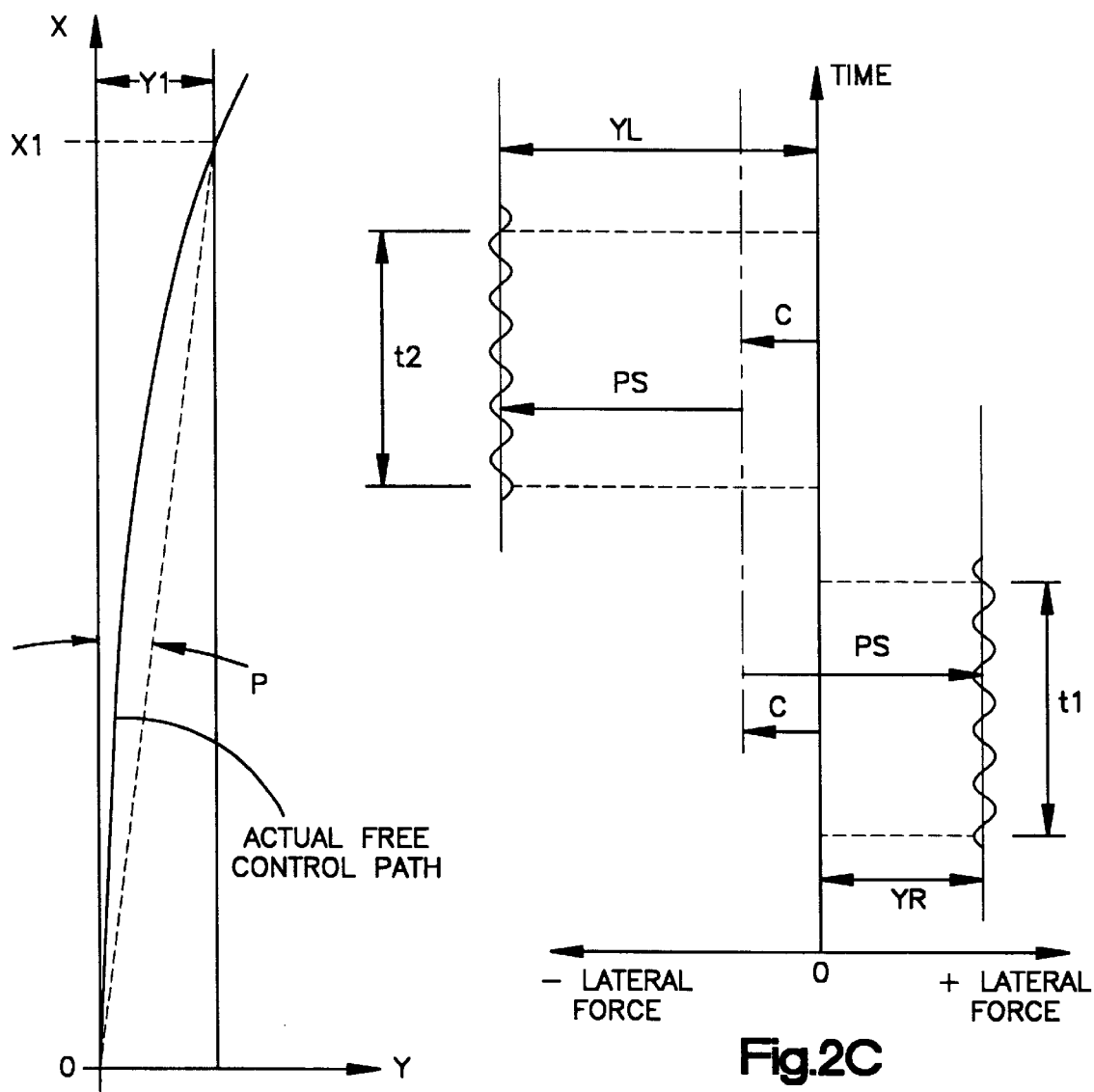
Fig.1
Fig.2C
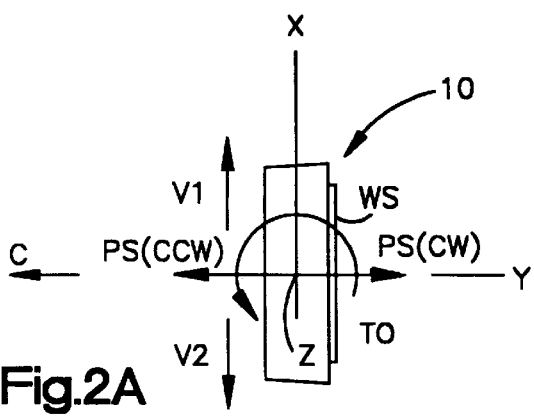
Fig.2A
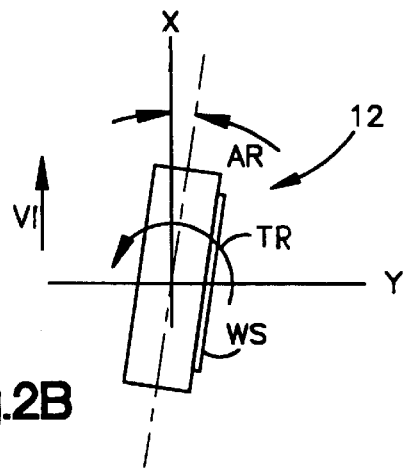
Fig.2B

TIRE TREAD TO COMPENSATE RESIDUAL ALIGNING TORQUE

This is a continuation of application Ser. No. 07/998,326 filed on Dec. 30, 1992 now abandoned.

BACKGROUND OF THE INVENTION

1. Field of the Invention

This invention relates to a pneumatic tire and more specifically to the modified tread of the tire.

2. Description of the Art

Vehicles have generally become smaller and tighter, or sharper, in steering response and sensitivity. The distribution of forces and moments on the tires from the ground surface at the contact patch interface are becoming more critical for obtaining good vehicle steering stability and handling. For example, steering pull is manifested as a tendency for a vehicle to drift left or right when the steering wheel is released. This pull is caused by a twisting moment on the tire about a Z-axis normal to the contact patch, and a lateral force perpendicular to the forward velocity of the vehicle along a Y-axis at the contact patch. This Z-axis moment is called the aligning torque and the Y-axis force is called the lateral force on the contact patch.

When a midcircumferential plane of the tire has an orientation at a small slip angle (say 0.25 degrees) with respect to its forward velocity vector, the lateral forces on the contact patch can be reduced to zero. This small slip angle is called the neutral slip angle. However, there remains a Z-axis moment at the contact patch called the residual aligning torque (RAT). Also, there is another small slip angle (say 0.35 degrees) of the tire plane with respect to the forward velocity vector where the Z-axis moment is zero. At this small slip angle a Y-axis force exists called the residual cornering force (RCF). Generally speaking, it is not possible to achieve a zero aligning torque at the same slip angle that yields a zero cornering force. In fact, most vehicle/tire combinations operate at a small steady state slip angle to yield a zero lateral force, and the steering system is used to provide a torque to compensate for the residual aligning torque. When the steering wheel is released, the vehicle will drift right or left depending on the magnitude and direction of the residual aligning torque. Vehicle manufacturers have established limits on the amount of drift allowed. For example, one vehicle manufacture limits the drift from tire sources to 3 meters in a forward distance of 100 meters, or a drift angle of 1.72 degrees. The theory of tire induced steering pull is documented in the Society of Automotive Engineers (SAE) Publication No. 750406. Aligning torque and lateral force are defined as they relate to the commonly used terms of plysteer and conicity in SAE Publication No. 870423.

It is known in the art that the tire belt structure and its cross-ply laminate of reinforcing members can cause a residual aligning torque or a residual cornering force. This is due to the bending-shear coupling of the belt package and especially due to the bending-twisting coupling within the belt package when the tire contacts the ground surface. The bending-twisting deformations in the contact patch have a greater significance than the bending-shear deformations. Small shear deformations have less impact than small twisting deformations because the twisting more directly affects the local contact stresses in the contact patch. SAE Publication No. 870423 discloses the influences on residual aligning torque due to both reinforcing member spacing and reinforcing member angle from a midcircumferential plane for a belt package having two belt plies. The publication also discloses the effect of having different bottom belt ply reinforcing member angles compared with top belt ply reinforcing member angles on the residual aligning torque. No procedure to eliminate residual aligning torque by belt reinforcing member changes was disclosed in this publication.

It is also known in the art that major modifications in the belt package construction can reduce an average lateral force at a zero slip angle (plysteer) to a small value. The average lateral force at zero slip angle is determined by rolling the tire about its axis of rotation and measuring a first lateral force magnitude then reversing the rotation of the tire and measuring a second lateral force magnitude. The average of these two lateral force magnitudes is called "plysteer" in the literature. In U.S. Pat. No. 3,945,422 plysteer is substantially reduced by constructing the belt package with multiple plies (3) which are symmetrically disposed. Other multiple belt package configurations are disclosed in SAE Publication No. 760731. However, reducing the plysteer to zero does not eliminate the residual aligning torque at the zero neutral slip angle. Furthermore, these references do not teach how to make modifications in the construction of a tire to reduce residual aligning torque.

It is also known in the art that the tread pattern and tread structure also have an effect on the residual aligning torque which is independent from the construction of the tire. Tread pattern and tread structure effects can have the same relative impact on residual aligning torque as changes in the belt package construction have.

The design of the tread effects both the residual aligning torque and the residual cornering force. When the tread pattern changes, the stiffness of the tread blocks are modified. For example, changes in the circumferential grooves in the tread pattern will change lateral stiffness and effect the residual aligning torque and the residual cornering force. Changes in lateral grooves can also modify the stiffness of the tread of the tire and cause bending-twisting deformation changes within the tread. Changes in the lateral groove angles can result in less differential contact patch tangential forces between the various tread elements. Hence, the tread becomes more compliant as the tire rolls. U.S. Pat. No. 4,819,704 discloses how modifications in the size and shape of tread blocks produced by circumferential and lateral groove changes reduce plysteer. The angle of the direction of the maximum shear rigidity of the tread blocks is specified between 40 and 75 degrees from a midcircumferential plane, and is opposite to the angle of reinforcing members in the outermost belt layers. The total surface area of the tread blocks is also disclosed as a factor in reducing plysteer. However, the reference does not disclose a procedure to change the residual aligning torque, and the reference does not teach how to change lateral groove angles without influencing tread induced tire noise and traction. The importance of tire lateral groove angles on noise is disclosed in U.S. Pat. No. 5,125,444.

It is also known in the art that tread rigidity along with asymmetrical treads can effect plysteer. For example, U.S. Pat. No. 5,016,695 discloses a directional tire having an asymmetrical tread pattern wherein the rib having the highest rigidity (no lateral grooves) is positioned to one side of the midcircumferential plane. This tread pattern alters the shape of the contact patch to give excellent driving stability at slip angles as small as 1 degree, and improves ride comfort during straight ahead traveling. However, there is no discussion in this patent of the effect of this tread pattern on residual aligning torque is given, and the disclosed driving stability is at angles larger than nominal neutral slip angles where the lateral force is zero.

The tread surface profile also influences the aligning torque and lateral forces on a free rolling tire. A difference in the tread radius and differences in rates of ground contact area were disclosed to promote the maneuverability of a car in Japanese Patent No. 57-147901 (JP). In this reference, the tread radius on the outside of the midcircumferential plane is made larger than the tread radius on the inside. This difference in tread radius and difference in shape of the ground contact area (contact patch) causes a conicity force. This basic construction of the tire results in one shoulder having a 1–2 millimeter larger radius than the other shoulder. This difference does not change with the rotation of the tire, therefore, the conicity force is in the same direction with clockwise or counterclockwise rotation. Opposed conicity forces exist when such a tire is mounted on the left compared with the right side of the vehicle and with the same side of the tire mounted to the exterior.

In addition to the influence of tread pattern and tread surface profile changes on the tire's contact patch forces, tangential stresses at this interface can be changed by the inclination of the tread blocks. The angle between the tread surface and the approximately radial faces of the lateral grooves has an important effect on the traction and uneven wear performance of the tread. This angle is also important in the driving and braking forces achieved by a tread block, especially on snow, ice and rough ground surfaces. The influence on overall driving and braking pull of a tread pattern having sloping tread block elements is disclosed in Japanese Patent Nos. 63-97,405 (JP) 2-293,206 (JP), and 2-293,205 (JP). The performance of the tire on ice, snow and rough roads are enhanced by the tilting of tread blocks forward or backward.

In JP 2-293206 the tire is actually reversed from early days of wear to last days of wear to take advantage of the changing stiffness of the tread blocks with wear. The disclosure of JP 63-97,405 optionally combines tread blocks to give a tread pattern that functions effectively on respective road surfaces. However, these patents do not teach how inclined tread blocks can be positioned and sloped to have an influence on the residual aligning torque. The aligning torque on the tires disclosed would be random as optionally combined, and may in fact increase the magnitude of the residual aligning torque. Japanese Patent No. 2-293,205 discloses similar sloping tread blocks resulting from the inclination of approximately radial faces of the lateral grooves to improve drive and brake performance. No specific tread pattern is illustrated in this patent.

Other similar patents which disclose sloping tread blocks which result from the inclination of lateral grooves in circumferential ribs are U.S. Pat. Nos.: 3,104,693; 4,284,115; 4,298,046 and 5,044,414. Durability of the tire at high speed is the problem addressed in U.S. Pat. No. 5,044,414 and improved by lateral groove shape and groove bottom curvature. The same problem and a similar solution is disclosed in U.S. Pat. No. 4,284,115. Tires having improved gripping and longitudinal adherence with treads biting into the rough road surfaces as well as ice and snow surfaces are disclosed in U.S. Pat. No. 3,104,693 and U.S. Pat. No. 4,298,046. Once again, driving and braking performance of the tire as a whole is disclosed. Random residual aligning torque values are anticipated when using the treads of these patents.

A tread pattern having modified ribs based on the direction of plysteer due to tire construction and the ground contact reaction force is disclosed in U.S. Pat. No. 4,305,445. This patent describes how the wear is influenced by the direction of "internal camber thrust" acting on the tire. The ground contact pressure is modified by providing small holes near the leading edge of lateral groove surfaces on one side and small holes near the trailing edges of lateral groove surfaces on the other side of the midcircumferential plane. This modifies the rigidity of tread blocks as they enter the contact patch on one side and exit the contact patch on the opposite side. No indication is given as to influence of these small holes on the plysteer or residual aligning torque, and random influences can be anticipated.

The sloping tread blocks disclosed in U.S. Pat. application Ser. No. 07/652,412 are provided to control uneven wear on a directional tire having an asymmetrical tread pattern. The two lateral ribs, each having tread blocks sloped in the same direction, have reduced braking forces from tread block radial deformations. The central ribs each having tread blocks sloped in a reverse direction, have reduced driving forces from tread block radial deformations. The driving axle tires are reverse rotated from the steer axle tires. No changes in the residual aligning torque is anticipated from the tire treads of this invention.

Even though there are different known ways to reduce plysteer, there remains a need to be able to control and reduce the residual aligning torque on the tire from the ground surface. This residual aligning torque remains even after the tread pattern and tire construction have been modified to reduce plysteer or conicity. This moment or torque exists even at a small slip angle (neutral slip angle) or at zero slip angle when plysteer is zero. These corrections are made difficult by a desire to avoid changes in the tread pattern that influence other tire performance characteristics. The optimum solution is to reduce the residual aligning torque to approximately zero with little or no change in the tire's construction and basic tread pattern in contact with the ground surface (contact patch). Such a solution would maintain the noise, traction and wear performance of the tire. There is no need to address improvements in driving or braking traction to eliminate steering pull when the steering wheel is released. Hence, in accordance with this invention, the tire should be first optimized for noise, traction and wear by changes in the tire's construction and tread pattern, then certain modifications can be made in the tread to reduce the residual aligning torque without influencing the initial optimization.

SUMMARY OF THE INVENTION

The object of this invention is to obtain a tire having an improved tread for straight ahead driving of a vehicle during free rolling (no steering) operation. In particular, an improved tread is desired that will result in the tire having essentially no residual aligning torque at a neutral slip angle. The improved tread of the tire is achieved by making a modification to the tread blocks, which can be determined by a method disclosed herein. This can be accomplished with little or no change in the tread pattern within the contact patch or in the tire's construction.

One embodiment of this invention is an improved tread for a tire having a plurality of ribs. A modified first rib is determined which includes a plurality of lateral grooves. Each of the first rib lateral grooves separates a pair of circumferentially adjacent first tread blocks. The first rib lateral grooves are defined by a first centerline draft angle. The first draft angle extends at an acute angle relative to a plane extending radially from the axis of rotation. A modified second rib is determined which is axially spaced from the first rib to the opposite axial side of a midcircumferential plane. The second rib also includes a plurality of lateral grooves each separating a pair of circumferentially adjacent second tread blocks. The second rib lateral grooves are defined by a second centerline draft angle. The second draft angle extends at an acute angle relative to a plane extending radially from the axis of rotation. The first draft angle extends in a direction relative to a radial plane opposite the direction that the second draft angle extends relative to another radial plane.

During a first rotation of the tire about an axis of rotation, with the tire in contact with a ground surface, the modified first rib has an effective rolling radius greater than a respective rolling radius of an unmodified first rib. The modified second rib has an effective rolling radius smaller than a respective rolling radius of an unmodified second rib with this first rotation. During a second rotation of the tire, opposite to the first rotation about the axis of rotation and with the tire also in like contact with the ground surface, the modified second rib has an effective rolling radius greater than the respective rolling radius of the unmodified second rib. For this second rotation the modified first rib has an effective rolling radius smaller than the respective rolling radius of the unmodified first rib. The resulting residual aligning torque on the tire from the ground surface is substantially eliminated during both the first and second rotations of the tire.

In a preferred embodiment of this invention, the first and second ribs are symmetrically positioned from the midcircumferential plane of the tire. In a most preferred embodiment, the first draft angle is selected equal to the second draft angle and the tread is a non-directional tread.

In another embodiment of the present invention, the tread further comprises at least one modified third rib and at least one modified fourth rib, each of which include a plurality of lateral grooves. Each third rib lateral groove separates a pair of circumferentially adjacent third tread blocks. The third rib lateral grooves are defined by a third centerline draft angle. The third rib is located on the same axial side of the midcircumferential plane of the tire as the position of the first rib. The third rib lateral groove draft angle extends in the same direction relative to a respective radial plane as the first rib lateral groove draft angle extends. Each of the fourth rib lateral grooves separates a pair of circumferentially adjacent fourth tread blocks. The fourth rib lateral grooves are defined by a fourth centerline draft angle. The fourth rib is located on the same axial side of the midcircumferential plane of the tire as the position of the second rib. The fourth rib lateral groove draft angles extend in the same direction relative to a respective radial plane as the second rib lateral groove draft angles extend.

A method for modifying the tread of tires to essentially eliminate a residual aligning torque for the tires is also presented and comprises the following steps. (1) A unmodified test tire is made having a predetermined rib type tread pattern with zero centerline draft angles for all lateral grooves separating circumferentially adjacent tread blocks. (2) The unmodified test tire is tested to determine a first residual aligning torque. (3) A modified test tire is made having the rib type tread pattern as in (1) but having centerline draft angles on both first and second ribs. The modified second rib is axially spaced apart from the modified first rib to the axially opposite side of a midcircumferential plane. The centerline draft angle of the first rib has an orientation with respect to a radial plane extending radially from the axis of rotation opposite to an orientation of the centerline draft angle of the second rib which extends from a respective radial plane. (4) The modified test tire is tested to determine a second residual aligning torque. (5) A system constant is calculated which is the second residual aligning torque minus the first residual aligning torque all divided by the centerline draft angle. (6) A final centerline draft angle is calculated for the tire as the first residual aligning torque as determined in (2) divided by the system constant. (7) Finally, a plurality of tires having the rib type tread pattern with the final draft angle in each lateral groove of both the modified first and second ribs are made and tested to verify that the tire has a modified residual aligning torque which is essentially zero. If not, the steps can be repeated to obtain a residual aligning torque near zero. This method can also be modified for use with tires having more than two modified ribs with centerline draft angles.

BRIEF DESCRIPTION OF THE DRAWINGS

Further features of the present invention will become apparent to those skilled in the art to which the present invention relates from reading the following specification with reference to the accompanying drawings, in which:

FIG. 1 is a graph of the trajectory taken by a vehicle equipped with typical tires and under free control;

FIG. 2(A) is the top view of a tire and coordinate system with the forces and moment on the tire during free rolling as illustrated;

FIG. 2(B) is the top view of the tire in FIG. 2(A) at a neutral slip angle;

FIG. 2(C) is a graphical illustration of plysteer and conicity lateral forces acting on the tire of FIG. 2(A) rolling forward then backward;

DESCRIPTION OF THE PREFERRED EMBODIMENTS

Figure 3:
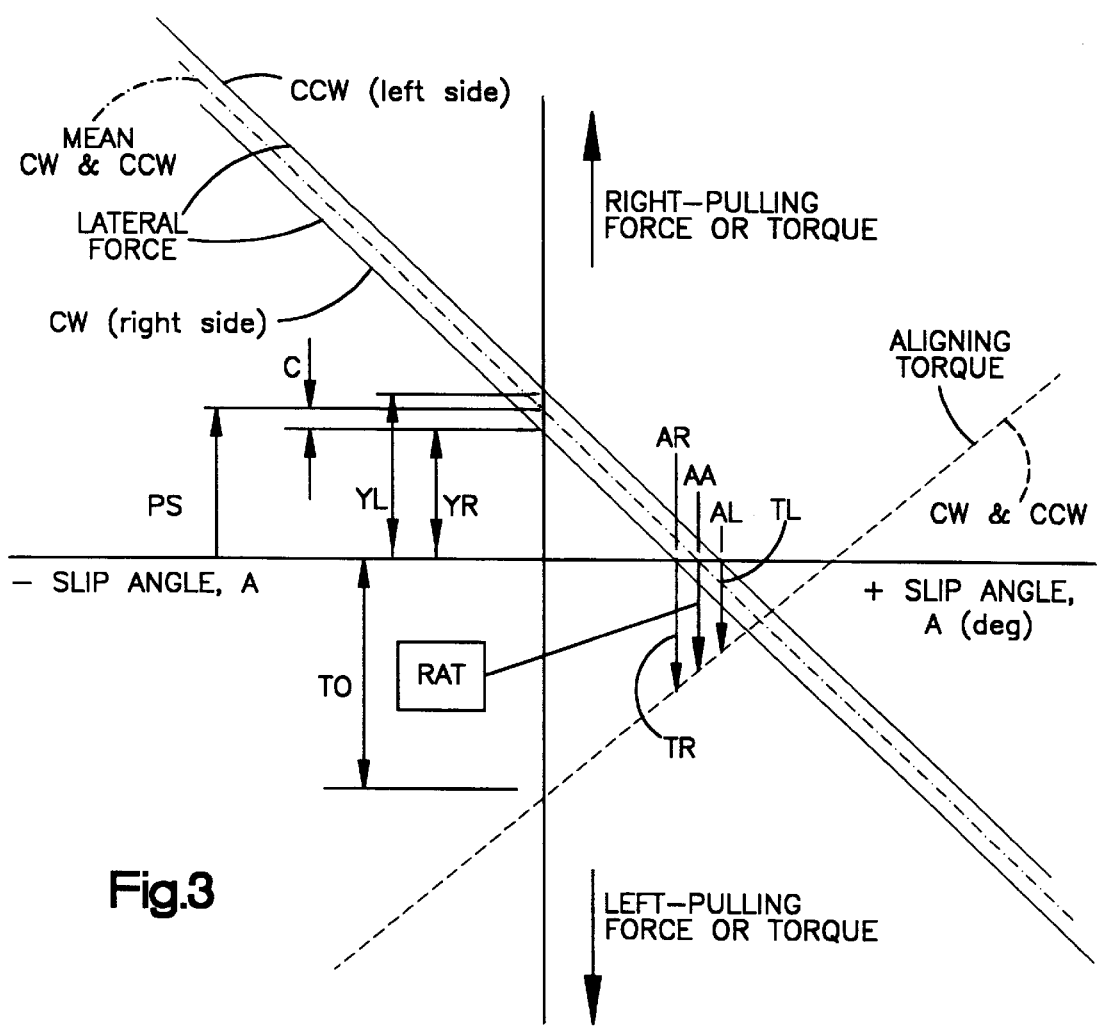
FIG. 3 is a graphical illustration of the lateral forces and aligning torque on a tire as a function of slip angle, and mounted on the left or right side of the vehicle.

The deviation of a vehicle equipped with typical tires from straight ahead travel is illustrated in FIG. 1. When the steering wheel is released at a forward travel position, X=0, the residual aligning torque on the typical tires will cause the vehicle to follow a free control path with a lateral displacement Y. At some distance X1 the lateral displacement Y1 is measured and a deviation angle P can be computed. Vehicle manufacturers provide specifications that limit the lateral displacements Y1 or deviation angle P at a travel distance X1 as a result of the residual aligning torque (RAT) of the tire.

The Tire and Rim Association (T&RA) of Copley, Ohio specifies the construction and loading parameters for a standard radial pneumatic tire for passenger cars, light trucks and the like. The standard or typical tire has a construction such that a lateral force and an aligning torque or moment is exerted on the tire by the ground surface when the tire is rolling straight ahead (no slip angle). These forces and moments are illustrated in FIG. 2. Initially at rest the tire is rotated clockwise as viewed from the white sidewall (WS) side at a constant speed V1 for a time t1. During time t1, the lateral force YR in the positive Y-direction exists on the tire along with an aligning torque T0 as shown in FIGS. 2(A) and 2(C). Torque T0 is nominally counterclockwise as viewed from the top of the tire, as in FIG. 2(A), when a two ply standard belt package has a right/left orientation. For example, a right orientation of the reinforcing members of the first or interior ply of the belt package extends upward and to the right. The tire is then stopped and the rotation as viewed from the WS side is reversed to counterclockwise at a constant speed V2 for a time t2. A negative lateral force YL exists on the tire during time t2 along with an aligning torque of approximately the same magnitude T0 counterclockwise. Other belt packages having orientations and number of plies other than two plies right/left are also within the scope of this patent.

The positive lateral force YR for clockwise rotation and the negative lateral force YL for counterclockwise rotation of the typical tire 10 can be considered as a combination of two component forces C and PS as shown in FIG. 2(C). These are commonly known as the conicity force C and the plysteer force PS discussed in the literature. Conicity force C does not change with the direction of rotation. Plysteer force PS (CW) is associated with clockwise rotation and plysteer force PS (CCW) is associated with counterclockwise rotation, as viewed from the WS side.

Lateral forces YR and YL will also make the vehicle have a lateral displacement during straight ahead steering (FIG. 1). However, the lateral forces YR, YL can be reduced to near zero by steering the tire/wheel system 12 relative to the velocity vector V1 to a steer angle AR as shown in FIG. 2(B). Angle AR is the neutral steer angle for clockwise rotation of the tire when viewed from the WS side. The problem of straight ahead travel of the vehicle now depends only on the residual torque TR at a slip angle AR. The disclosure of this invention teaches one skilled in the art how to essentially eliminate this residual aligning torque without internal tire construction changes or tread pattern changes in the contact patch.

The tire can be used on either the left or right side of the vehicle. With the white sidewall (WS) side of the tire exterior to vehicle on the right the tire is rotating clockwise when the vehicle moves forward and when viewed from this WS side. In reverse, the tire is rotating counterclockwise on the left side of the vehicle when it is mounted with the WS side to the exterior of the vehicle, when viewed from WS side and the vehicle moving forward. The result expressed in an X-Y coordinate system, is that lateral forces are in the same direction for left and right tires on a single axle. However, at some slip angle AL on the left side and at another slip angle AR on the right side, the lateral forces are near zero.

Lateral force and aligning torque as a function of slip angle are illustrated in FIG. 3. If the tire is mounted on the right side of the vehicle and rotates clockwise (CW), a slip angle AR is shown to yield a zero lateral force and a negative aligning torque TR. The lateral force at a zero slip angle is force YR as previously illustrated in FIG. 2. If the tire instead is mounted on the left side of the vehicle and rotates counterclockwise (CCW), a slip angle AL is shown to yield a zero lateral force and a negative aligning torque TL. The lateral force at a zero slip angle is force YL as previously illustrated in FIG. 2. Other force and torque values, C, PS and TO which were shown in FIG. 2 are also illustrated in FIG. 3. At an average slip angle AA the average aligning torque is called the residual aligning torque (RAT). This invention discloses how to reduce the residual aligning torque RAT to essentially zero. The difference between the aligning torque TR for clockwise rotation or the aligning torque TL for counterclockwise rotation and the residual aligning torque RAT is small (FIG. 3). Actually, a tire according to the invention would be slightly overcompensated in one rotation and slightly undercompensated in the opposite rotation. Hence, in theory, if the same tire could be used on both sides of the vehicle, the resultant torque would be essentially zero. However, two different tires must be used.

Figure 4:
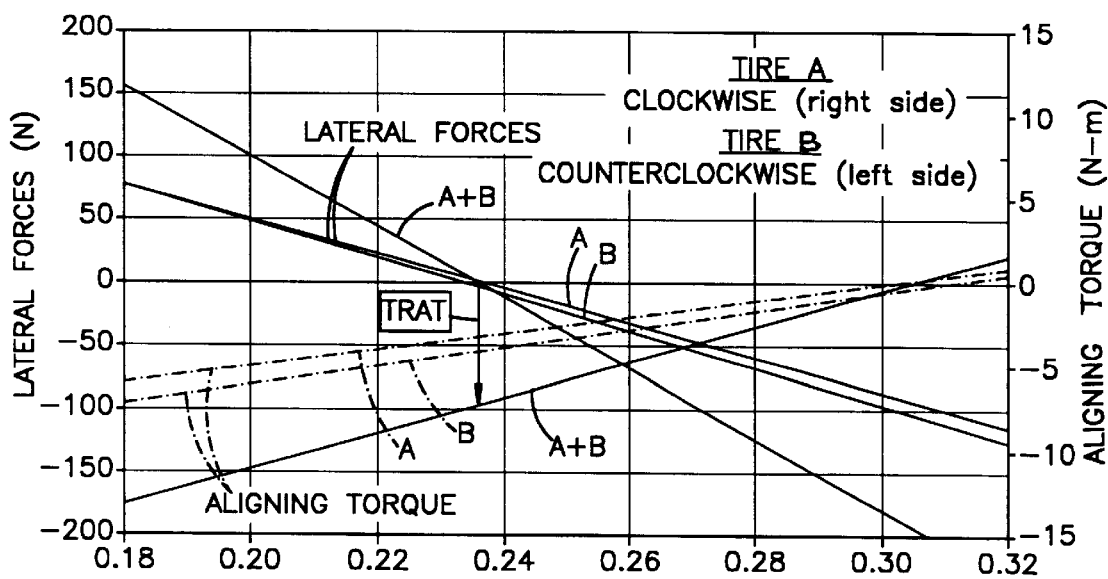
FIG. 4 is the graphical illustration of total aligning torque and lateral force with two tires on one axle of a vehicle.

The effect of having two tires A and B on one axle is illustrated in FIG. 4. The force and torque values illustrated are actual tests results for two production P215/65 R15 tires of the same manufacturer and tire line. Small variations are noted between tire A and tire B with the total residual aligning torque (TRAT) being again an average of the residual aligning torques RATs for each tire. This graph illustrates that uniformity of the tire is not a problem provided the same tire type (manufacturer and tire line) is used on both sides of the vehicle. Hence, correcting a tire line for RAT in accordance with this invention will produce the desired straight ahead steering behavior for a vehicle having all tires of the same line.

Figure 5:
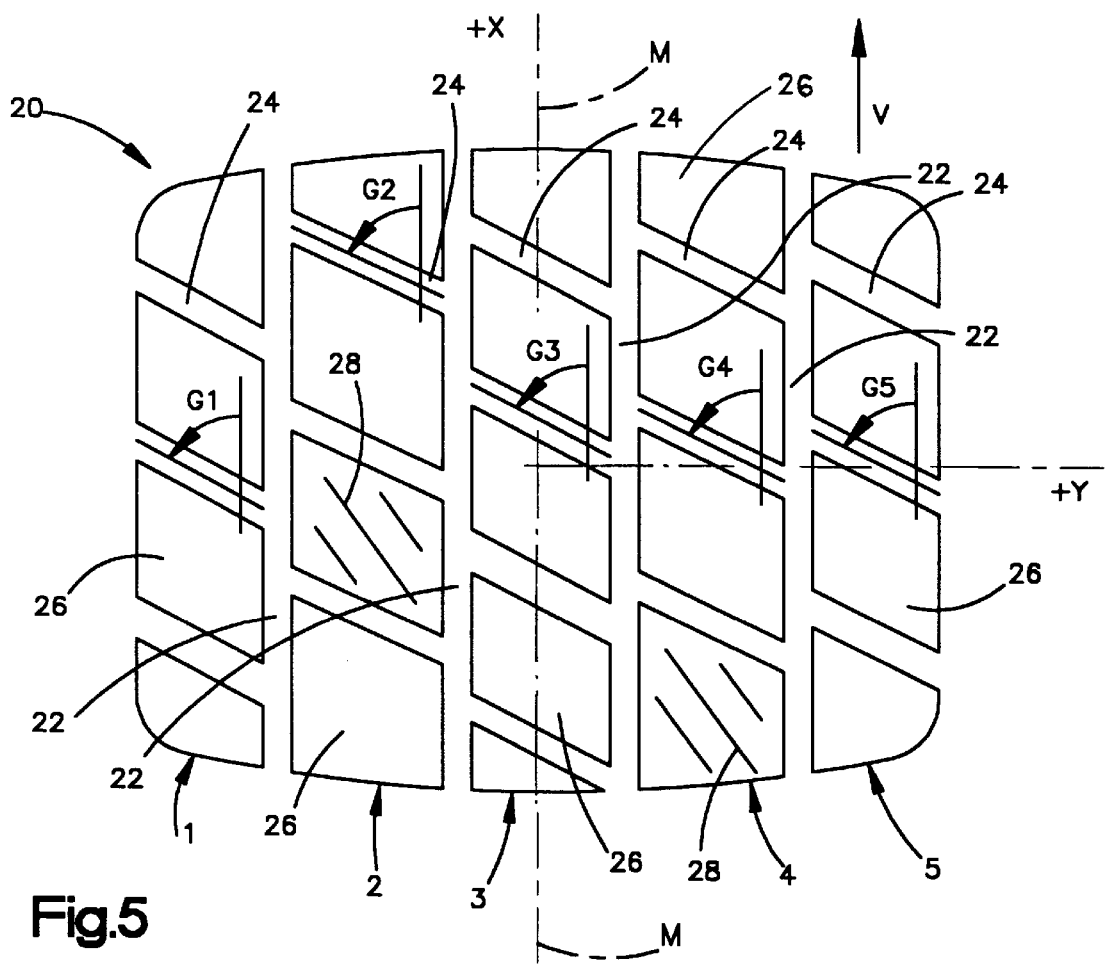
FIG. 5 illustrates a typical tire to ground surface contact patch for a 5 rib tire having lateral grooves.

The embodiments of this invention are preferably used with a rib type tire. For example, the contact patch of a simplified rib type tire 20 is illustrated in FIG. 5 showing 5 circumferential ribs 1–5 separated by 4 circumferential grooves 22. The tire illustrated is a non-directional tire having a symmetrical tread pattern with respect to a mid-circumferential plane M. The circumferential grooves 22 can be linear, curvilinear or zig-zag, and all such grooves are within the scope of this invention. The ribs 1–5 are each divided by a plurality of circumferentially spaced lateral grooves 24. Each lateral groove 24 separates a pair of circumferentially adjacent tread blocks 26. The lateral grooves 24 may also be linear, curvilinear or zig-zag, as well as discontinuous, and all such grooves are within the scope of this invention. Discontinuous lateral grooves extend only partially from one circumferential groove 22 to the adjacent circumferential grove 22. Small cuts or sipes 28 may also subdivide the tread blocks 26 to modify their relative X-axis to Y-axis stiffness properties.

Figure 6:
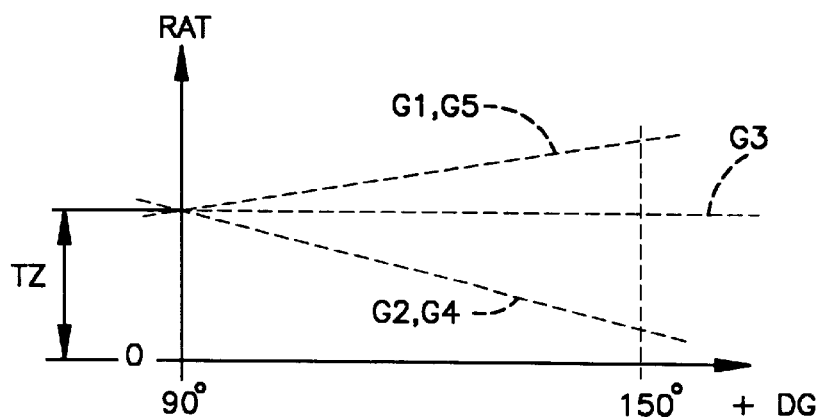
FIG. 6 graphically illustrates residual aligning torque (RAT) changes with lateral groove angle changes for the contact patch of FIG. 5.

It was found that the lateral groove angles in the contact patch G1–G5 have a direct influence on the residual aligning torque RAT. For example, the graph of FIG. 6 illustrates how the change in groove angles DG from a groove angle of 90 degrees changes the RAT. For a tire two belt package construction with right/left belt ply reinforcing member orientations or directions for the interior ply and exterior ply respectively, the interior ribs 2,3 & 4 produce a change in RAT opposite to the lateral ribs 1 and 5. The residual aligning torque RAT has a value TZ when all lateral groove angles G1–G5 are 90°.

Changes within the tread pattern lateral groove angles in the contact patch are within the scope of this disclosure. However, groove angles have only limited impact when compared with the total magnitude of the residual aligning torque to be compensated for in a tire. Clearly these tread pattern changes can be used with this invention to essentially eliminate the influence of residual aligning torque on the straight ahead steering of the vehicle. However, changes made in the form of lateral groove angles in the contact patch for the purpose of reducing residual aligning torque (RAT) can also introduce noise, traction and wear changes that are not acceptable. A unique feature of this invention is that it can be used to substantially eliminate residual aligning torque after the tread pattern of the tire has been optimized for noise, traction and wear performance.

Figure 7:
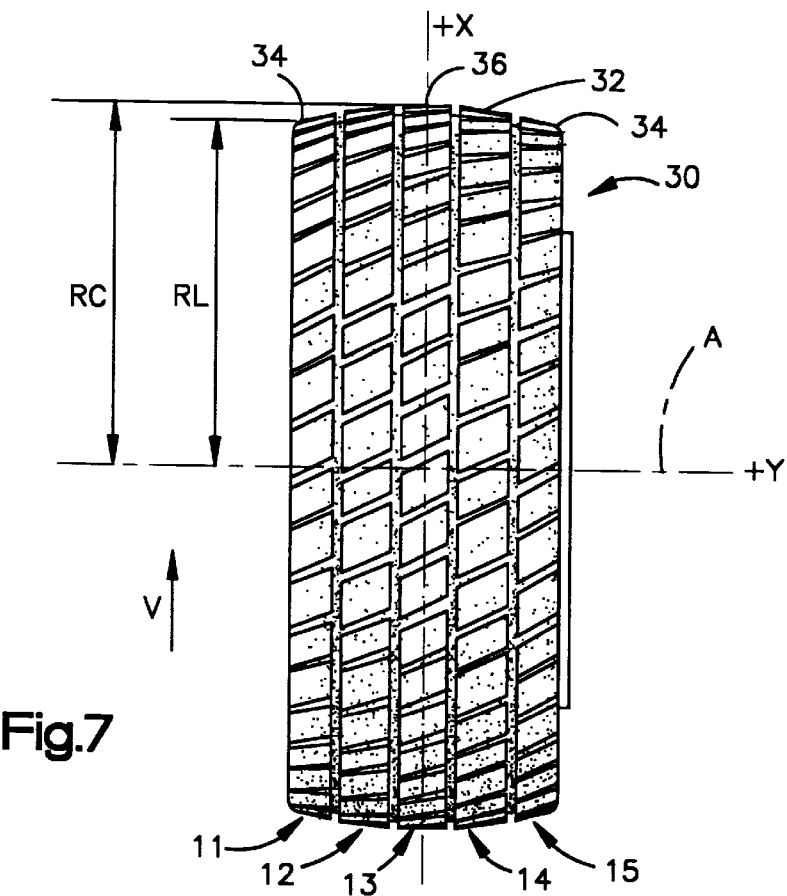
FIG. 7 is the top plan view of a typical 5 rib tire illustrating a nominal tread surface curvature.
Figure 8:
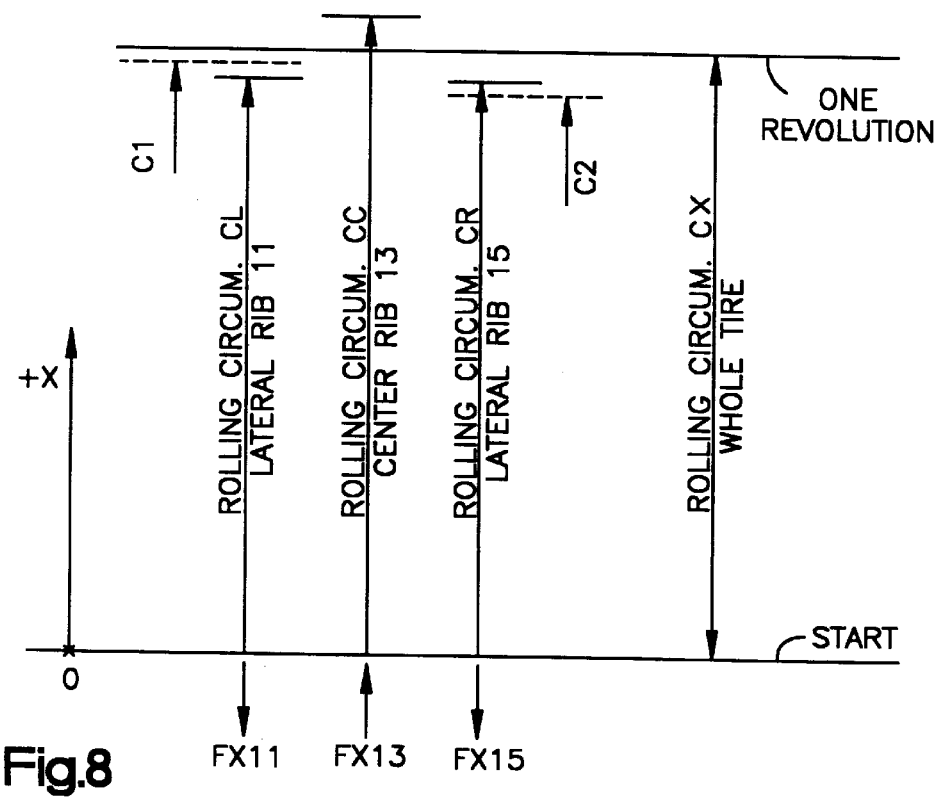
FIG. 8 is a graphical illustration of the rolling circumference of the tire of FIG. 7 during one revolution.

The invention resides in selectively changing the ribs in the tread of the tire to effectively modify the rolling radius of the selected ribs. Before these inventive modifications are described in detail it is helpful to describe observations and measurements made on a typical rolling tire 30 as illustrated in FIG. 7. The tire 30 has a forward velocity V as viewed from the top side of the tire, and is rolling under load on a level surface. Having access to the necessary instruments, machines and vehicles, it is a relatively simple task to define the tire's "rolling circumference", which is the distance run by the tire 30 while rotating by exactly one turn. Measurements can be done on a free rolling tire to obtain the rolling circumference CX of the whole tire. This is illustrated by the graph of FIG. 8 where the tire started at X=O and rolls forward for one revolution a distance CX.

In addition to this global measurement of the whole tire, it is possible to define the rolling circumference of each circumferential row of blocks, or ribs 11, 12, 13, 14, 15 of the tread pattern widthwise across the curvilinear surface 32 of the tire 30. This analysis has shown, for example, that the individual rolling circumferences CL, CC, CR of ribs 11, 13, 15 can differ significantly from the rolling circumference CX of the whole tire. This takes into consideration several tire design factors such as the load carried by each rib, the widthwise curvature of the surface 32, circumferential flexibility of the tread and the length of each rib in the contact patch.

In general, the rolling circumference CC of the center rib 13 situated near the center 36 of the tire tread is greater than the rolling circumference CX of the whole tire. Conversely, the rolling circumferences CL and CR of ribs 11 and 15, situated near the lateral edges 34 of the tread, are smaller than rolling circumference CX of the whole tire, as shown in FIG. 8. This is in part due to the widthwise crown surface of the tread 32 (FIG. 7) having a larger radius RC in the center 36 than a radius RL on both lateral edges 34. The ribs which have the greatest rolling circumference will tend to pull the tire forward, while those which have the smallest rolling circumference will tend to pull it backward. This "Tug of War" results in longitudinal tangential forces FX11 and FX15 on lateral ribs 11 and 15 respectively and force FX13 on center rib 13. These forces are constantly exerted by the ground surface on the tread elements. A driving or braking torque applied to the tire will not significantly change the inequality in rolling circumferences between the rows of blocks, or ribs. The applied torque will only tend to lengthen or shorten all the rolling circumferences, without significantly changing their relative differences.

Figure 9:
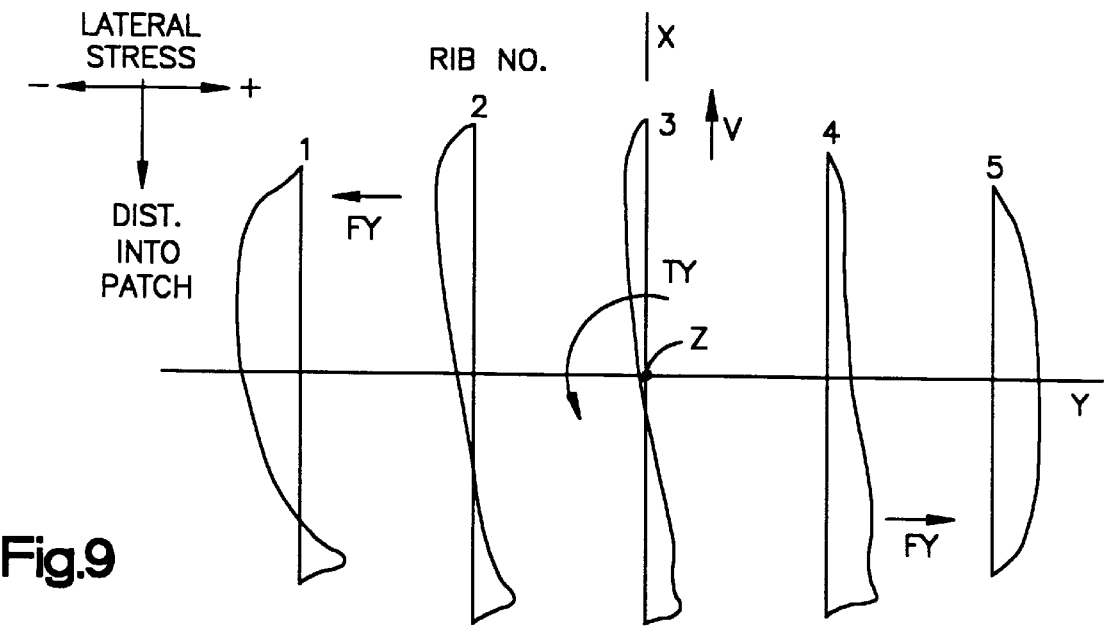
FIG. 9 graphically illustrates typical lateral tangential stresses from the ground surface on each rib of a 5 rib tire during rolling through the contact patch.
Figure 10:
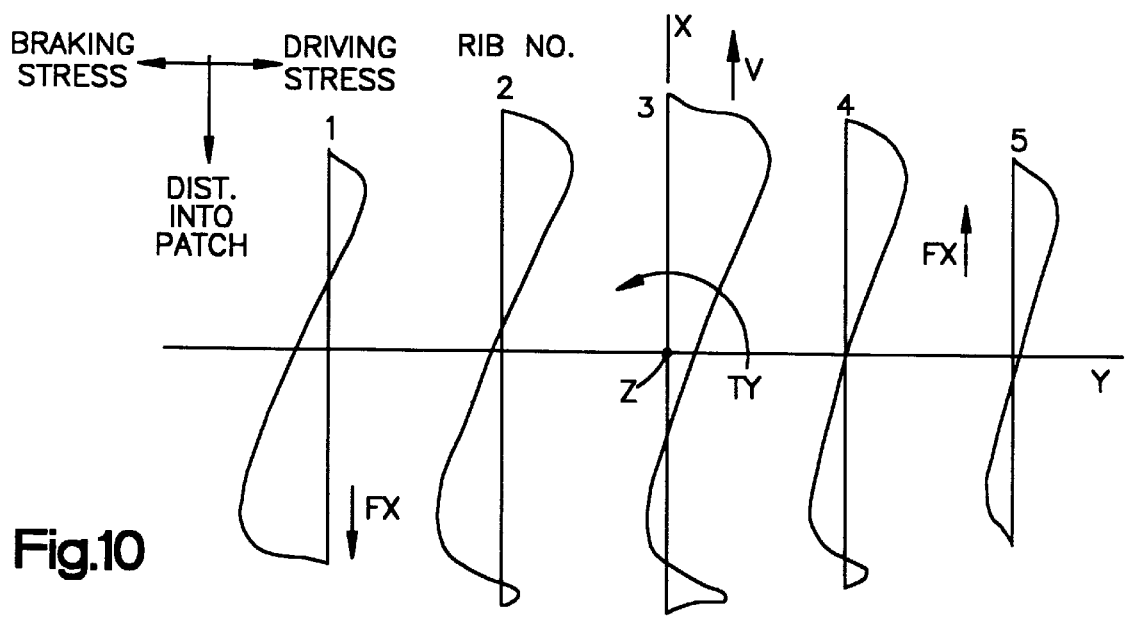
FIG. 10 graphically illustrates typical longitudinal tangential stresses from the ground surface on each rib of a 5 rib tire during rolling through the contact patch.

The widthwise average of the actual stress distribution on each individual rib 11, 12, 13, 14 and 15 is important in understanding the improvements made by the invention. Typical tangential stresses in a lateral Y-axis direction are illustrated in FIG. 9 for a typical radial pneumatic tire having five ribs. Similarly, typical tangential stresses in a longitudinal X-axis direction are illustrated in FIG. 10. Stresses on the various ribs of a rolling and loaded tire are discussed in SAE Publication No. 740072. Stresses are those exerted on the tire by the ground surface in the contact patch resulting from the contact of the tire with the ground surface. The nonsymmetrical lateral stress distribution in the Y-direction shown in FIG. 9 results in unbalanced forces FY that produce a torque or moment TY about a Z-axis normal to the contact patch. The nonsymmetrial longitudinal stresses of FIG. 10 also result in unbalanced forces FX that produce a torque or moment TX about the Z-axis. The combined torque TY+TX at a zero slip angle is equal to the aligning torque TO illustrated in FIGS. 2 and 3.

Of particular interest is the shape of the longitudinal stresses of FIG. 10. A distribution of longitudinal stresses is noted which is typical of most rib type tread patterns. During initial contact, the stresses are driving (+X direction) and during final contact the stresses are braking (−X direction). A modification of this stress distribution will be discussed in more detail below.

Figure 11:
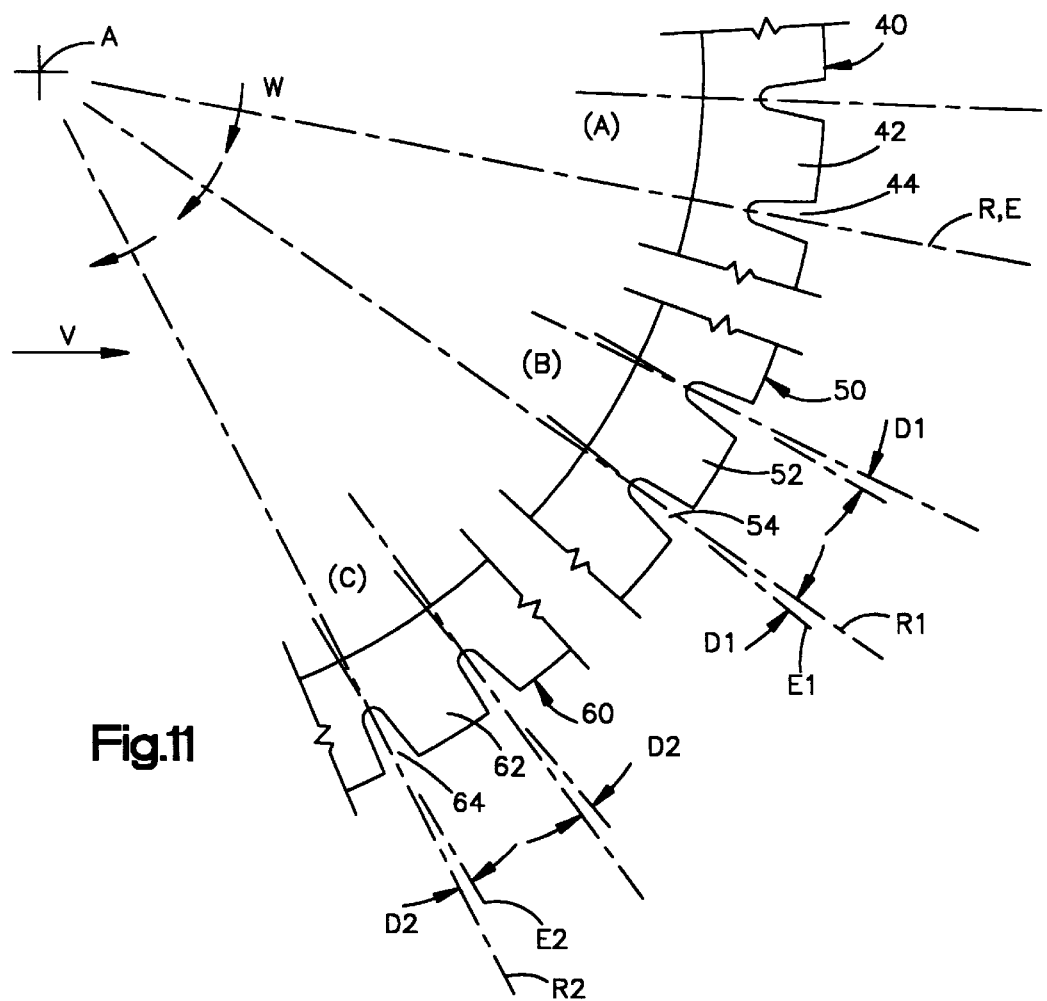
FIGS. 11(A), (B) and (C) are partial section views of three different ribs of the tread of this invention taken parallel to a midcircumferential plane.

We have found that the inequality in rolling circumference between ribs, as illustrated in FIG. 8, can be used to introduce additional tangential force differences between respective ribs. These differences can be used to introduce an aligning torque T to a free rolling tire that essentially compensates for the tire's own residual aligning torque RAT. As seen in FIGS. 7 and 8, the rolling circumference is directly proportional to a rolling radius RC or RL of the respective rib. The inventors have discovered that an "effective rolling radius" of any circumferential row of blocks (ribs), can be changed by the inclination of the lateral grooves separating the adjacent blocks in a rib, as illustrated in FIG. 11. Therefore, in this invention, not all the tread blocks are disposed exactly radially, as shown in section A of FIG. 11, but some are angled forward or backward, as shown in section B of FIG. 11 and section C of FIG. 11 respectively, to provide a modified effective rolling radius (rolling circumference) for selected ribs.

Figure 12:
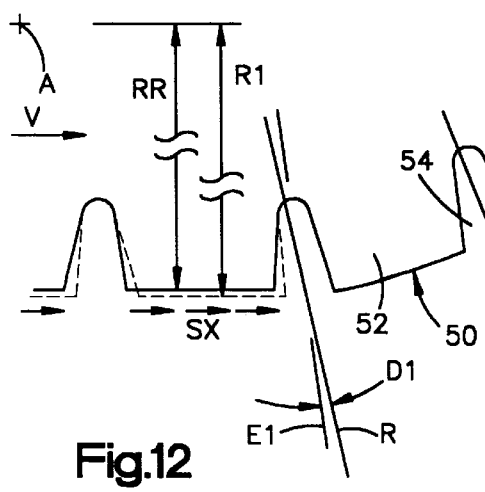
FIG. 12 is a partial section view of a rib having a forward inclined tread block according to FIG. 11(B) at the entrance of contact with the ground surface according to the invention.
Figure 13:
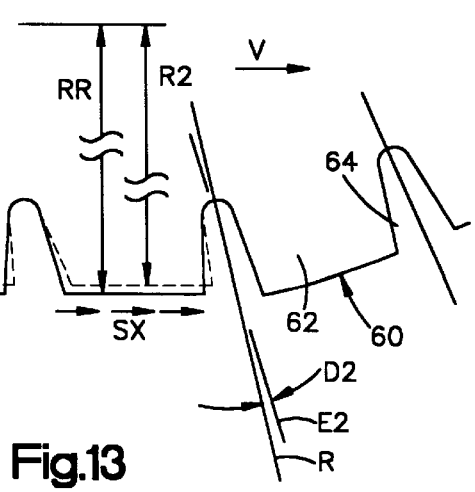
FIG. 13 is a partial section view of a rib having a backward inclined tread block according to FIG. 11(C) at the entrance of contact with the ground surface according to the invention.

The modifications of the rolling circumference of a circumferential row of tread blocks, or rib, by the use of inclined lateral grooves, and thereby inclined tread blocks, takes advantage of a tendency for lifting or lowering of the ground contacting surface of the individual tread, as illustrated in FIGS. 12 and 13. Under the effect of longitudinal tangential stresses SX exerted by the ground at the entrance of the contact patch, the effective rolling circumference of a modified rib 50, 60 of this invention is different from that of an unmodified rib 40. The lifting or lowering changes the rolling radius RR to an effective rolling radius R1, R2 for the circumferentially adjacent tread blocks 52, 62.

The concept of using the tangential stress SX on inclined stress blocks to introduce a virtual or effective rolling radius is introduced in this invention. The actual rolling radius RR is the distance from the axis of rotation to the ground surface and the rolling circumference of the whole tire is equal to 2 $\pi$RR. The effective rolling radius of various ribs in introduced to help understand the nature of the tangential stresses or forces on the contact patch of the tire from the ground surface supporting the tire.

To investigate the potential from effective rolling radius changes, a tire can be modified to have all its tread blocks inclined in one direction (say 5 degrees). Rolling this tire in one direction the revolutions per mile are measured and a first actual rolling radius computed. Reversing the rotation of the tire, the revolutions per mile are again measured and a second actual rolling radius computed. The actual rolling radius with tread blocks sloped forward as viewed from the top of the tire are anticipated to be approximately 3 percent greater than the actual rolling radius with tread blocks sloped backward.

The validity of this discovery was also confirmed by actual measurements of the longitudinal tangential stresses between tire and ground on each rib of the tread pattern. By selecting the appropriate centerline draft angles for the lateral grooves between adjacent pairs of blocks in preselected circumferential rows of blocks, or ribs, of the tread pattern, it was found possible to introduce a compensating aligning torque that essentially eliminates all the residual aligning torque between the tire and the ground surface for a freely rolling tire. A centerline draft angle is defined herein as the inclination of the lateral groove centerline E from a plane R extending radially from the axis of rotation A. Draft angles are measured in a plane parallel to the midcircumferential plane M of the tire.

Figure 16:
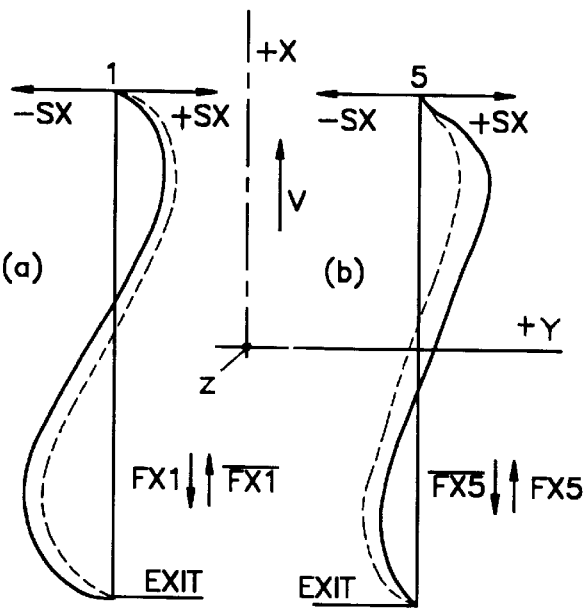
FIGS. 16(a) and (b) are graphical illustrations of the two lateral rib stresses of FIG. 10 showing changes in the longitudinal tangential stresses and forces as a result of the invention.

The selection of the centerline draft angles of the lateral grooves can be made by the use of computer modeling or by actually measuring changes in the longitudinal tangential stress SX exerted by the ground on each circumferential rib (FIG. 16 for example). Analyzing the results, it is simple to decide in which direction the centerline draft angle of each lateral groove in a rib of the tread pattern should be inclined to obtain a desired rolling radius change.

The illustrations of FIG. 11 show the three possible conditions that can exist on an individual rib. Each condition represents a different inclination for lateral groove centerlines E, E1, E2 from the radial plane R, R1, R2 in a plane parallel to the midcircumferential plane M of the tire. The condition illustrated in section A of FIG. 11 shows a rib 40 having a zero centerline draft angle for the lateral groove 44, and the tread block 42 is not inclined. This condition is typical, within manufacturing tolerances, of the standard T&RA tire. The condition illustrated in section B of FIG. 11 shows a rib 50 having a centerline draft angle D1 for the lateral groove 54, and the tread block 52 is inclined forward with an angular rotation W of the tire. The condition illustrated in Section C of FIG. 11 shows a rib 60 having a centerline draft angle D2 for the lateral groove 64, and the tread block 62 is inclined backward during angular rotation W.

Generally speaking, the tread blocks 62 of the rib 60 are inclined backward from the direction of rotation to decrease the effective rolling radius from RR to R2 as illustrated in FIG. 13. Conversely, blocks 52 of the rib 50 are inclined forward from the direction of rotation to increase the effective rolling radius from RR to R1 as illustrated in FIG. 12. This effective rolling radius increase on rib 11 of the tire of FIG. 7, for example, will increase its rolling circumference from a value of CL to a larger value C1 (FIG. 8). This increase will reduce the braking force FX11 of rib 11. An effective rolling radius decrease on rib 15 of FIG. 7, for example, will decrease the rolling circumference from a value of CR to a smaller value C2. This decrease will increase the braking force FX15 of rib 15.

As previously disclosed, forward and backward inclined tread blocks are formed by inclining a centerline axis E of the lateral grooves with respect to a plane R extending radially from the axis of rotation of the tire as shown in FIG. 11. Forward and backward inclined tread blocks are also related to the direction of rotation W of the tire about its axis of rotation A. Forward inclined tread blocks 52 have an acute angle D1 to the centerline axis E1 of the lateral groove 54 from the radial plane R of the tire in the same (clockwise or counterclockwise) direction as the rotation of the tire W about its axis of rotation A. Conversely, backward inclined tread blocks 62 have an acute angle D2 to the centerline axis E2 of the lateral groove 64 from the radial plane R of the tire in an opposite direction to the rotation W of the tire about its axis of rotation A.

The preferred values of the centerline draft angles D1 or D2 of the lateral grooves 54, 64 are influenced by many variables, such as the transverse crown radius of the tire, the construction of the belt package plies, the modulus of the tread rubber, the contact surface ratio of the tread pattern and of course the shape, size and siping of individual tread blocks. However, an experimental procedure has been developed to determine the preferred centerline draft angles for each type of tire. A detailed experimental procedure or method is disclosed later in this discussion. Such a method is very convenient, and takes only a few hours. Using this method, the definition and magnitude of centerline draft angles can be determined in a relatively short period of time.

Figures 14, 15:
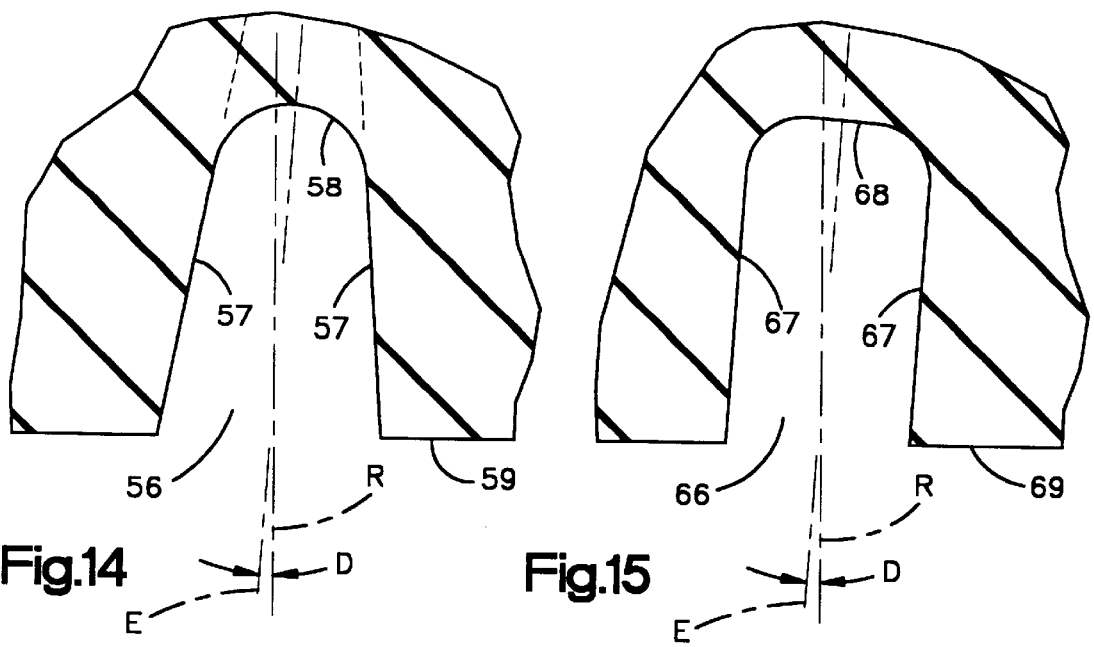
FIGS. 14 & 15 are sectional views of two typical lateral grooves having centerline draft angles taken parallel to a midcircumferential plane according to the invention.

To achieve the effect of centerline draft angles it is necessary that the width of the lateral grooves be such that each individual tread block 52 or 62 has the flexibility to be pushed backward or forward, and thus effectively change height, while its ground contacting surface remains sensibly in the plane of the ground surface at the contact patch. The sidewall and bottom configuration of lateral grooves is not critical to achieve the improvements disclosed in this invention. The configuration of two typical lateral grooves 56 and 66 in a plane parallel to the midcircumferential plane M are illustrated in FIGS. 14 and 15. The sidewalls 57 or 67 may be converging or parallel respectively, with either a bottom contour 58 having a single radius or a bottom contour 68 having multiple radii. A line which bisects two respective sidewalls is the centerline E of the lateral groove. The total centerline draft angle D of the lateral groove centerline E from the radial plane R is the structural feature that is varied to change the effective rolling radius of a rib. In addition, the angle between sidewalls 57 or 67 and their respective surfaces 59 and 69 have only limited influence on the residual aligning torque and correction procedure disclosed in this invention.

Siping in the tread blocks 52, 62 are usually not wide enough to allow effective rolling radius changes before the adjacent blocks come into contact. Also, friction between sipe defined contacting blocks frequently locks them together, cancelling the effect to be achieved. If inclined sipes are placed in a tread block which is delimited by radial grooves, the effect of the inclined sipes on the rolling circumference of the rib is usually negligible and not predictable.

A further explanation of the influence of centerline draft angles is illustrated in FIG. 16. This illustration shows the longitudinal tangential stresses SX on the two unmodified lateral ribs 1 and 5 (solid line) previously shown in FIG. 10, and the new stresses SX as a result of centerline draft angles on the same lateral ribs after being modified (dashed line). The lateral rib 1 of this example has centerline draft angles to provide an effective increase in the rolling radius by sloping the tread blocks forward. The initial longitudinal force FX1 resulting from the stresses shown by the solid line has been modified by the stress changes to new stresses shown by the dashed line. The result is a change $\overline{FX1}$ in longitudinal force FX1 (FIG. 16(*a*)). The other lateral rib 5 of this example has centerline draft angles to provide an effective decrease in the rolling radius by sloping the tread blocks backward. The initial longitudinal force FX5 resulting from the stresses shown by the solid line has been modified by the stress changes to new stresses shown by the dashed line. The result is a change $\overline{FX5}$ in longitudinal force FX5 (FIG. 16(*b*)). If centerline draft angles are selected equal on the two sides of a symmetrical tread pattern, force changes $\overline{FX1}$ and $\overline{FX5}$ will be approximately equal and opposite in direction. No changes in driving or braking forces are expected using equal centerline draft angles which are symmetrically positioned. The resulting force changes introduce an aligning torque T that compensates for the original RAT of the unmodified tire.

The result of having one rib 50 on one side of the midcircumferential plane M with forward inclined tread blocks (FIG. 12) and the other rib 60 on the other side of the midcircumferential plane M with backward inclined tread blocks (FIG. 13) will produce an effective rolling radius R1 on the former side larger than another effective rolling radius R2 on the latter side of the tire, as previously disclosed. This configuration of the tire effectively introduces a condition where the rolling circumference C1 on one rib of the tire is larger than the rolling circumference C2 on another rib of the tire, as shown in FIG. 8. This is similar to providing an effective conicity. However, a conicity force C is always extended in the same lateral direction for clockwise and counterclockwise rotation of the tire as illustrated in FIG. 2(C). This is not the condition with the tire of this invention. For example, a modified rib having forward inclined tread blocks being a first rib increases its rolling circumference, and another modified rib having backward inclined tread blocks of a second rib decreases its rolling circumference. A change in the direction of rotation of the tire would cause the first rib to have its tread blocks inclined backward (thus decreasing its rolling circumference) while the second rib would have its tread blocks inclined forward (thus increasing its rolling circumference). However, this change in direction of rotation would not reverse the direction of the induced torque T. Hence, this torque T could again help compensate the residual aligning torque RAT, as previously disclosed.

Figure 17:
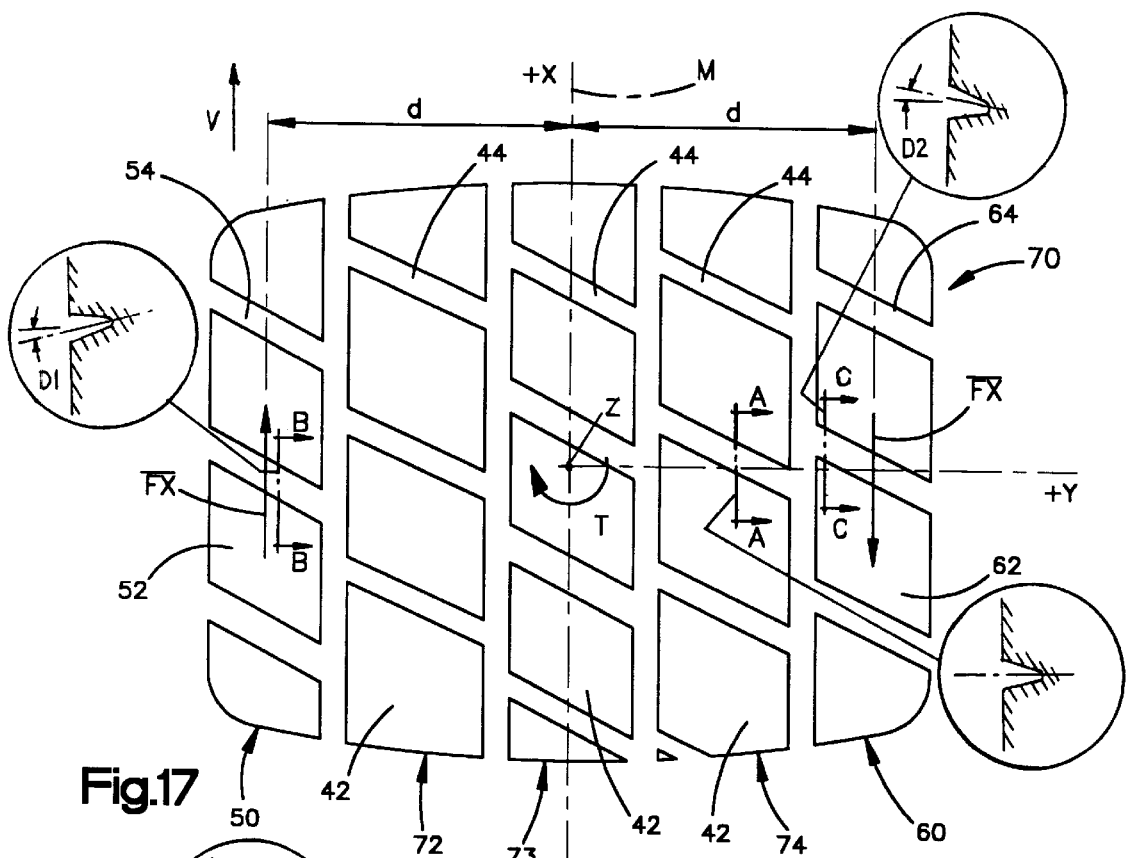
FIG. 17 illustrates graphically a typical 5 rib tire contact patch having 2 lateral ribs with centerline draft angles to produce the longitudinal forces and a moment as illustrated in accordance with the invention.

The ribs having a greater influence on the aligning torque as a result of changing their effective rolling radius (rolling circumference) are the lateral ribs of the tread pattern. This is due to the larger axial distances "d" to the ribs from the midcircumferential plane M. For example, the contact patch of a tread 70 is shown in FIG. 17. The change in longitudinal tangential force $\overline{FX}$ of a lateral rib 50 or 60 times a moment arm d gives a torque $\overline{FX} \times d$ about the Z-axis. This induced torque T can compensate for the residual aligning torque RAT inherent in the construction and tread pattern of the tire. Using both lateral ribs 50 and 60 with tread blocks 52 of one rib 50 inclined forward and tread blocks 62 of the other rib 60 inclined backward, the induced torque T about the Z-axis is even greater, being the combined sum of the individual lateral rib force changes or T=$\overline{FX} \times 2d$. The other ribs 72, 73 and 74 shown in FIG. 17 have tread blocks 42 with zero centerline draft angles in the lateral grooves 44.

Figure 18:
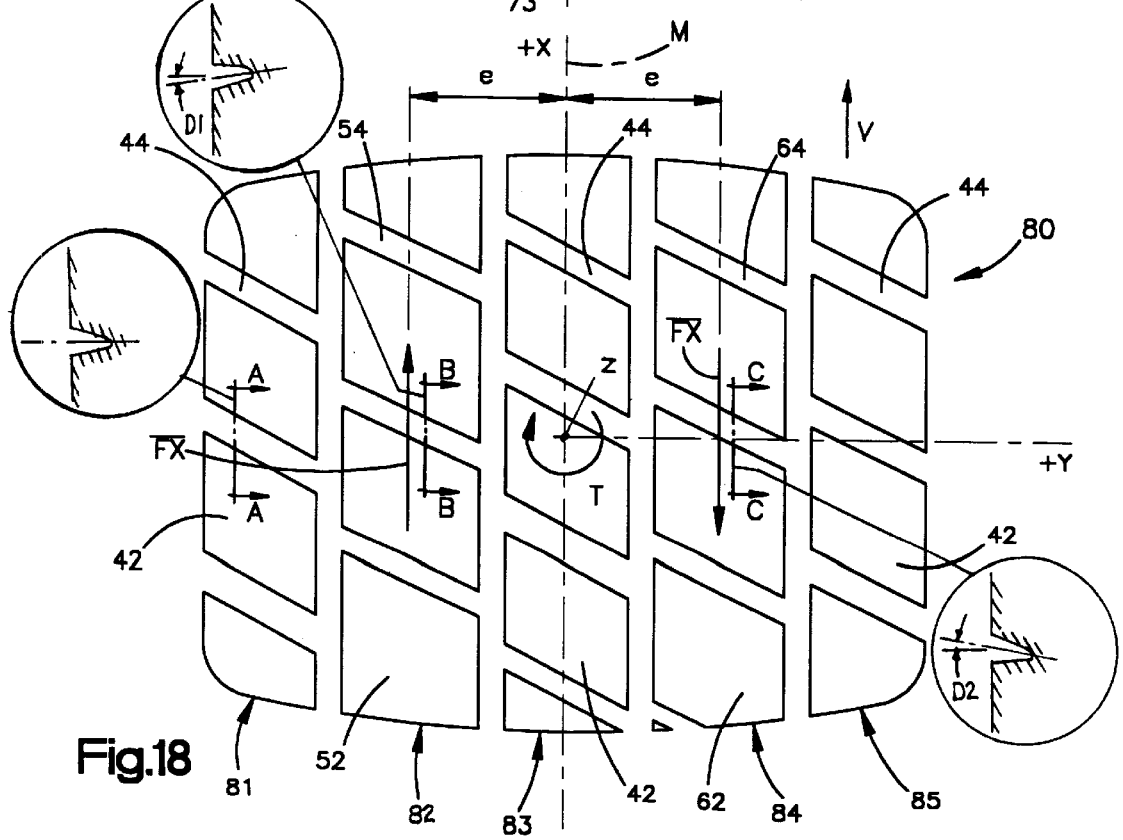
FIG. 18 illustrates another embodiment of a 5 rib tire contact patch having 2 intermediate ribs with centerline draft angles to produce the longitudinal forces and a moment as shown in accordance with the invention.

It is within the scope of this invention to modify the tread to have centerline draft angles D in lateral grooves of ribs other than the two lateral ribs. Whereas, the modification to have centerline draft angles on lateral ribs is preferred, there may be other performance parameters, such as tread wear, that make intermediate rib modifications more suitable. For example, the contact patch of a tread 80 having two intermediate ribs 82, 84 with lateral grooves 54, 64 having centerline draft angles D1, D2 is illustrated in FIG. 18. Rib 82 has draft angle D1 (FIG. 12) in the lateral grooves 54 to give tread blocks 52 which are inclined forward during forward motion V of the vehicle. Rib 84 has draft angle D2 (FIG. 13) in the lateral grooves 64 to give tread blocks 62 which are inclined backward during forward motion V of the vehicle. The resulting change in longitudinal forces $\overline{FX}$ times the moment arm 2e gives an induced torque T=$\overline{FX} \times 2e$ to help compensate for the residual aligning torque RAT of the tire. The other ribs 81, 83 and 85 shown in FIG. 18 have radial tread blocks 42 with zero centerline draft angles in the lateral grooves 44. Sections A, B and C in FIGS. 17 and 18 refer to the partial rib sections of FIGS. 11(A) and 11(B) and 11(C) respectively. The induced torque T using intermediate ribs with centerline draft angles has been found to be about one fourth as effective as using centerline draft angles within lateral ribs.

Relatively small changes in the residual aligning torque RAT can be realized by incorporating draft angles in the center rib of tread patterns having a center rib. However, the moment arm (d and e in the previous examples) is essentially zero in such cases and changes in the rolling circumference of center rib 3 alone (FIG. 8) does not induce a torque T.

A combination of modifications in the centerline draft angles of the lateral grooves of both the lateral and intermediate ribs is within the scope of this invention. If the residual aligning torque RAT is large, it may be desirable to modify the draft angles in all the lateral grooves to provide a first plurality of tread ribs formed on a first side of the midcircumferential plane and a second plurality of tread ribs formed on a second side of said midcircumferential plane. Using this invention, a person skilled in the art may select lateral ribs, intermediate ribs or both to essentially eliminate the residual aligning torque RAT by modifying the tread to have centerline draft angles within the lateral grooves.

A relationship can be established and used to determine the preferred centerline draft angles to essentially eliminate the residual aligning torque RAT. For example, a 4 or 5 rib symmetrical tread pattern (for 5 ribs see FIG. 5) of a non-directional tire can be characterized by the following relationships:

G1=G5 (lateral groove angle for ribs 1 and 5 in the contact patch);

G2=G4 (lateral groove angle for ribs 2 and 4 in the contact patch); and

D1=D2 (equal and opposite centerline draft angles symmetrically positioned).

As previously mentioned, the center rib 3 with its lateral groove angle G3 (FIG. 5) has little influence on the residual aligning torque RAT. In a preferred embodiment of this invention, lateral grooves of a center rib 3 are not modified.

The modified residual aligning torque $\overline{RAT}$ on the tire of this invention at a neutral slip angle AA, can be formulated as $$\overline{RAT} = TC + K_1 \times G1 + K_2 \times G2 + K_3 \times D1$$

where TC is the aligning torque in Newton meters due to the overall tire construction, D1 is the centerline draft angle in degrees. The two terms $K_1 \times G1$ and $K_2 \times G2$ are aligning torques in newton meters due to the tread pattern lateral groove angles G1=G5 and G2=G4 and $K_3$ is an experimentally determined system constant (Nm/deg) for the tire and tread. The first three terms on the right are the unmodified tread's residual aligning torque RAT as previously disclosed and illustrated in FIG. 3. That is, $$RAT = TC + K_1 \times G1 + K_2 \times G2 = (TR+TL)/2$$

Therefore, the modified residual aligning torque $\overline{RAT}$ becomes $$\overline{RAT} = RAT + K_3 \times D1.$$

The system constant $K_3$ is determined experimentally using the following steps:

a) a test tire is made having a predetermined tread pattern wherein all centerline draft angles have D1=0;

b) the value of $\overline{RAT}_1$ is determined experimentally at a neutral slip angle AA as previously defined, see FIG. 3, where $\overline{RAT}_1$=RAT as D1=0.

c) another test tire is made having the same tread pattern as in (a) but having a relatively large centerline draft angle $\overline{D1}$ (for example 10 degrees);

d) a new value of $\overline{RAT}_2$ at a neutral slip angle AA is experimentally determined as in (b) above; and e) the system constant $K_3$ is calculated from the relationship $$K_3 = \frac{\overline{RAT}_2 - \overline{RAT}_1}{\overline{D1}} (N_m/deg)$$

We know that the desired value for the modified residual aligning torque $\overline{RAT}$ is zero. That is, $$\overline{RAT} = 0 = RAT + K_3 \times D1.$$

This equation can be solved for the final centerline draft angle D1 (where D1 is equal and opposite to D2). Draft angle D1 is the draft angle which essentially eliminates the residual aligning torque at a neutral slip angle AA.

The desired draft angle is then calculated as $$D1 = -RAT/K_3$$

Tires are then manufactured with these draft angles and evaluated to prove the validity of the modifications.

Figure 19:
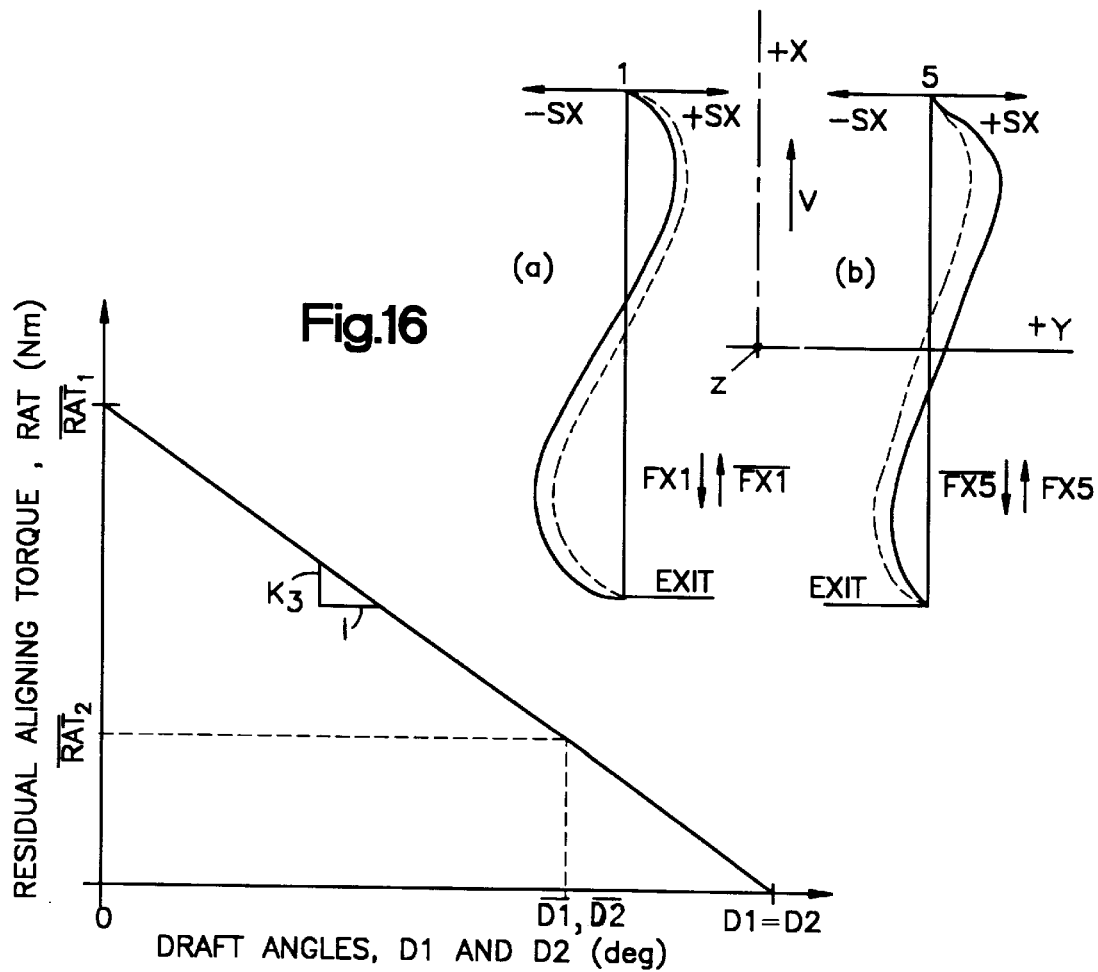
FIG. 19 is a graphical illustration of the change in residual aligning torque with a change in centerline draft angles according to the invention.

The steps outlined above are as illustrated in FIG. 19. At centerline draft angles equal to zero the residual aligning torque RAT is equal to the value $\overline{RAT}_1$. At a second value of the centerline draft angle $\overline{D1}$, $\overline{D2}$ the residual aligning torque has a value $\overline{RAT}_2$. These two values are used to calculate the slope of the residual aligning torque RAT vs. draft angle D1, D2 curve. The constant slope is referred to as the system constant $K_3$. Numerous experimental tests have been conducted which verify the linear relationship between the modified residual aligning torque and centerline draft angles. This fact allows the single linear term $K_3 \times D1$ to be used in the formulation above for the symmetrical tread with two modified ribs.

This analytical/experimental method can be expanded, for example, to determine modifications for two symmetrical pairs of two ribs each having lateral grooves with centerline draft angles. In this example, the ribs are preferably symmetrical with respect to a midcircumferential plane of the tire. This is illustrated by combining the features of one centerline draft angle for the lateral grooves of two symmetrically positioned two lateral ribs (FIG. 17) and another centerline draft angle for the lateral grooves of two symmetrically positioned intermediate ribs (FIG. 18). To introduce this into the modified residual aligning torque $\overline{RAT}$ equation, the term $+K_4 \times D3$ is added to the right side of the initial equation. For example, in FIG. 17 the centerline draft angle D3 is the draft angle for the lateral grooves of rib 72, which is equal and opposite to the centerline draft angle D4 for the lateral grooves of rib 74. Centerline draft angle D3 has the same orientation to the radial plane R as the centerline draft angle D1, and centerline draft angle D4 has an opposite orientation to the radial plane R. The system constant $K_4$ (Nm/deg) is also determined experimentally.

To determine system constant $K_4$ requires additional steps in the procedure outlined above. First, a second smaller centerline draft angle (for example $\overline{D1}=\overline{D3}$=5 degrees) is carved into a modified but identically constructed tire having the same tread pattern. Then, the above step (c) should be performed with $\overline{D1}$ and $\overline{D3}$ both having a first relatively large centerline draft angle (for example 10 degrees) before $\overline{RAT}_2$ is determined. Next, a third value of the modified residual aligning torque $\overline{RAT}_3$ is experimentally determined with this second centerline draft angle. Finally, the system constants $K_3$ and $K_4$ are determined by solving the equations $$\overline{RAT}_1 = RAT, \; D1=D2=D3=D4=0$$

$$\overline{RAT}_2 = RAT + K_3 \times D1 + K_4 \times D3$$

$$\overline{RAT}_3 = RAT + K_3 \times D1 + K_4 \times D3$$

The system constants $K_3$, $K_4$, are used in the original equation, wherein the modified residual aligning torque is made essentially zero. That is, $$\overline{RAT} = 0 = RAT + K_3 \times D1 + K_4 \times D3.$$

In this case, either the value of D1 or D3 can be selected and the remaining value determined to provide the desired $\overline{RAT}$=0. Selection of one or the other centerline draft angles, D1 or D3, may be based on the performance requirements of the tread, such as uniform wear or a need to maintain water evacuation through the lateral grooves.

This same analytical and experimental approach can be used for a directional tire having an asymmetrical tread pattern. However, the residual aligning torque and associated vehicle drift problems with directional tires having asymmetrical tread patterns are generally not as amplified as with symmetrical tread patterns. Furthermore, asymmetrical tread patterns can be selected to more effectively reduce the RAT. This is due to the type of asymmetrical tread patterns used and the mounting limitations placed on tires with directional requirements. The method of this invention would require more experimental testing and evaluation for some asymmetrical tread patterns. In addition, it may be more difficult to define two symmetrically positioned ribs from a midcircumferential plane which can have draft angles D1 and D2 respectively. However, it is within the scope of this invention to apply the teachings herein to asymmetrical tread patterns and directional tires.

Centerline draft angles have been determined for a variety of tire sizes and tire lines using the method of this invention. For example, centerline draft angles were used on the two lateral ribs of a 195/60 R15 Michelin MX4 tire. The tread pattern and construction had an initial residual aligning torque RAT of 1.4 Newton meters at a neutral slip angle AA of 0.26 degrees (See FIG. 3). A centerline draft angle for each lateral groove on one lateral rib was determined to give forward inclined tread blocks 52 (FIG. 11(B)). A centerline draft angle for the lateral grooves on another lateral rib was determined to give backward inclined tread blocks 62 (FIG. 11(C)). It was found that centerline draft angles of 4 degrees substantially compensated for the residual aligning torque RAT of the unmodified tire to the extent that the modified residual aligning torque $\overline{RAT}$ was equal to only 0.1 Newton meters.

Considerable experimental evidence has been collected to verify the utility of this invention. Tires of various size and shape have been modeled and tested with nonzero centerline draft angles in lateral grooves of various circumferential ribs. The residual aligning torques of these tires have been compensated by the induced torque T using this invention. Centerline draft angles in a range of about 3 to 15 degrees have compensated for RAT when two symmetrical positioned lateral ribs alone were used. When four or more symmetrical ribs have nonzero centerline draft angles in their lateral grooves, the range of centerline draft angles was from about 2 to 12 degrees to compensate for the RAT. Without symmetry of two modified ribs from the midcircumferential plane M, centerline draft angles of from about 2 to 20 degrees can be effectively used.

The magnitude of the centerline draft angles D required to produce an induced torque T to compensate for the residual aligning torque RAT depends somewhat on the effectiveness of the tread pattern in reducing RAT without modifying the tread to have nonzero draft angles. For example, the lateral grooves G1–G5 of the tread pattern illustrated in FIG. 5 have an independent influence. This was modeled in the analysis above as $K_1 \times G1 + K_2 \times G2$. Studies have shown that the centerline draft angles can be expressed as a percentage of the angle between the lateral groove axial centerline at the tread surface separating adjacent tread blocks in a rib and the midcircumferential plane (lateral groove angle). The practical limit on this angle for most tires is 60 to 150 degrees as illustrated in FIG. 5, for example. Centerline draft angles in a range of about 2 to 30 percent of the lateral groove angle have been verified by analysis.

From the above description of the invention, those skilled in the art will perceive improvements, changes and modifications. Such improvements, changes and modifications within the skill of the art are intended to be covered by the appended claims.

Having described the preferred embodiments of the invention, what is claimed is:

1. A tire which is rotatable about an axis of rotation and contacts a ground surface thereby defining a contact patch, and has a mid-circumferential plane which bisects said tire in a plane perpendicular to said axis of rotation, said tire having a tread comprising:

a) a first tread rib formed on a first side of said mid-circumferential plane;

b) a second tread rib formed on a second side of said mid-circumferential plane;

c) said first tread rib being divided into first tread blocks by a plurality of first lateral grooves;

d) a first draft angle defined as an acute angle measured in a plane parallel to the mid-circumferential plane between the centerline plane of each one of said plurality of first lateral grooves and a respective first radial plane extending radially from said axis of rotation through a respective first lateral groove;

e) said second tread rib being divided into second tread blocks by a plurality of second lateral grooves;

f) a second draft angle defined as an acute angle measured in a plane parallel to the mid-circumferential plane between a centerline plane of each one of said plurality of said second lateral grooves and a respective second radial plane extending radially from said axis of rotation through a respective second lateral groove; and, g) said first and second draft angles lying in opposite directions from said first and second radial planes respectively so that rotation of said tire on said ground surface causes a first longitudinal tangential force in one direction to be created by said first tread blocks and a second longitudinal tangential force to be created by said second tread blocks, said first and second draft angles having a predetermined value such that said first and second tangential forces produce a torque about an axis normal to said contact patch that substantially eliminates residual aligning torque on said tire in use on a vehicle.

2. The tire set forth in claim 1, wherein the first and second draft angles are in a range of 2% to 30% of a respective lateral groove angle in the contact patch, said respective lateral groove angle defined as an angle between a respective centerline plane of said respective lateral groove at the ground contact surface of the tread and the mid-circumferential plane.

3. The tire set forth in claim 1, wherein the first and second ribs are located at the respective axially outermost positions of said tread on opposite sides of said mid-circumferential plane.

4. The tire set forth in claim 1, wherein said tread ribs are symmetrically positioned from the mid-circumferential plane of the tire and the first draft angle is equal to the second draft angle.

5. The tire set forth in claim 1, wherein said first and second draft angles are in the range of about 2 degrees to about 20 degrees.

6. The tire set forth in claim 1, wherein said tread is a non-directional tread.

7. The tire set forth in claim 1, wherein said first rib is positioned on one axial side of a mid-circumferential plane of said tire and said second rib is asymmetrically positioned on the other axial side of the mid-circumferential plane, said first draft angle being of a different magnitude than said second draft angle.

8. The tire set forth in claim 1, wherein each pair of circumferentially adjacent tread blocks are spaced apart a sufficient predetermined distance such that said pair of tread blocks do not contact one another during use of said tire.

9. The tire set forth in claim 1, wherein said tread further comprises a plurality of ribs, including said first and second tread ribs, the ribs being separated by circumferential grooves which are essentially parallel to a mid-circumferential plane and having a centerline configuration selected from the group consisting of linear, curvilinear, and zig-zag configurations, said ribs being spaced apart a sufficient predetermined distance such that said ribs do not contact one another during operation of said tire.

* * * * *